UNITED STATES PATENT OFFICE.

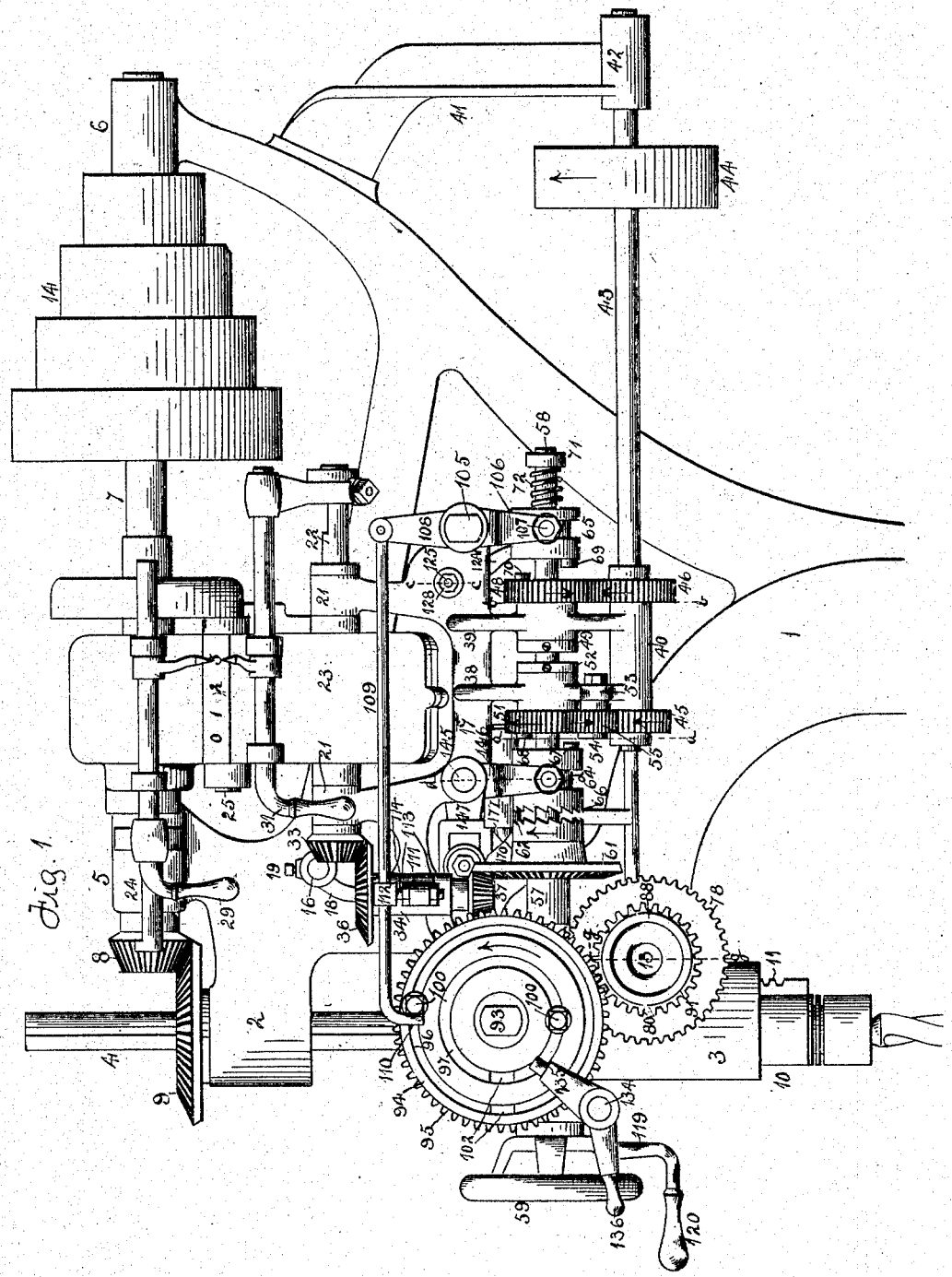

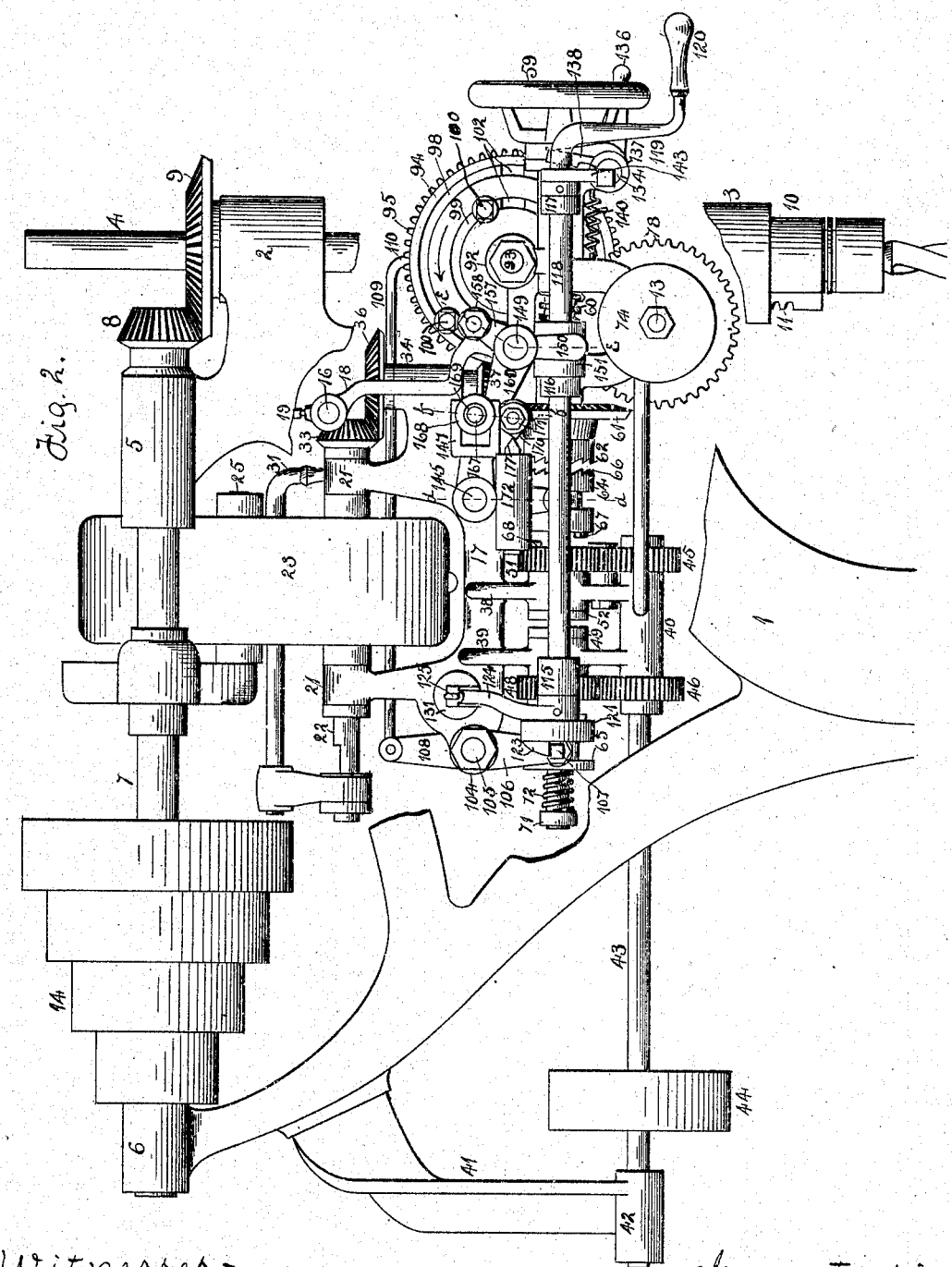

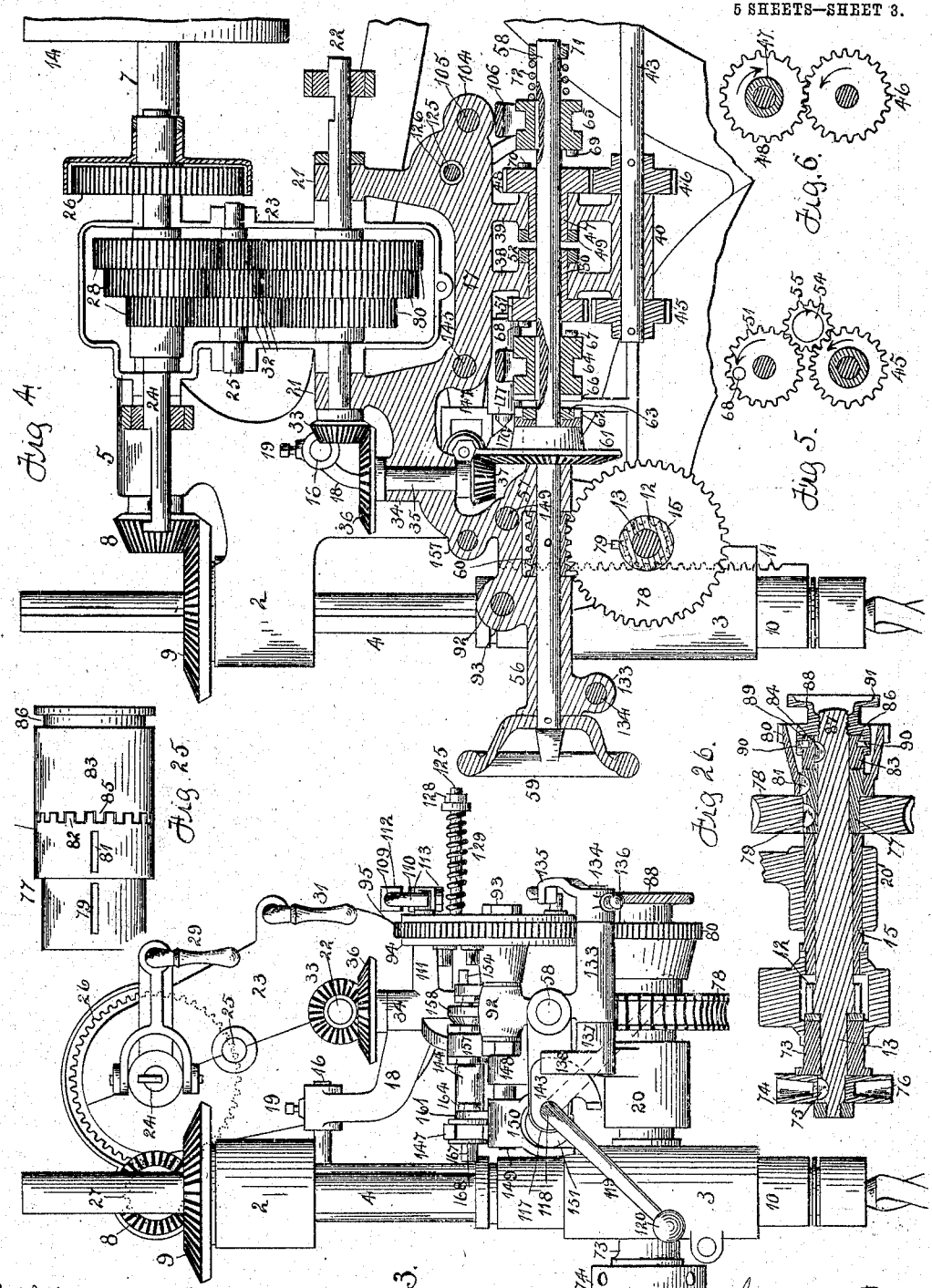

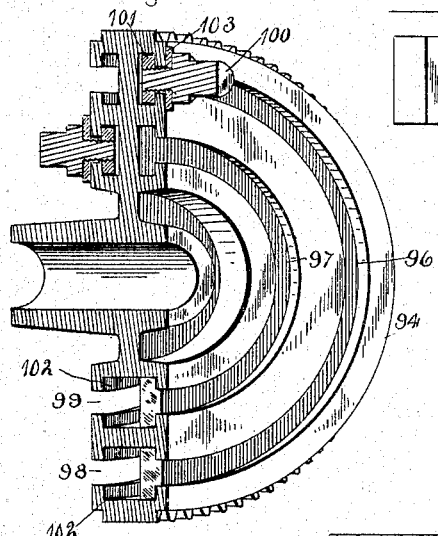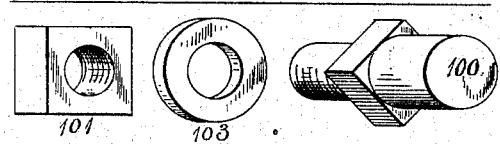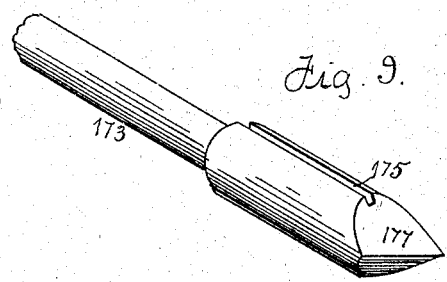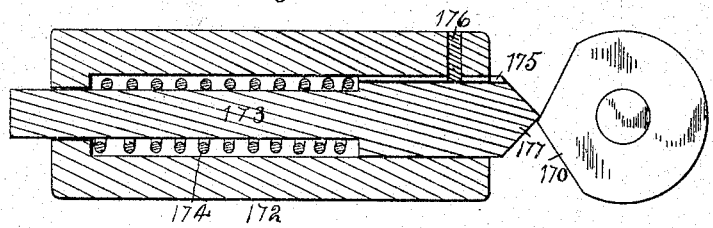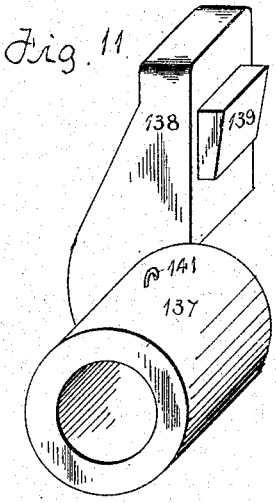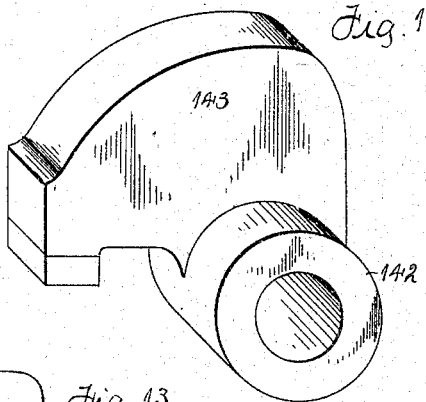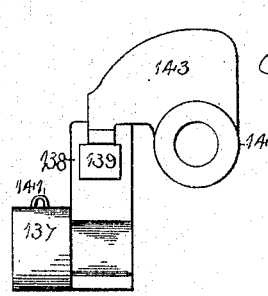

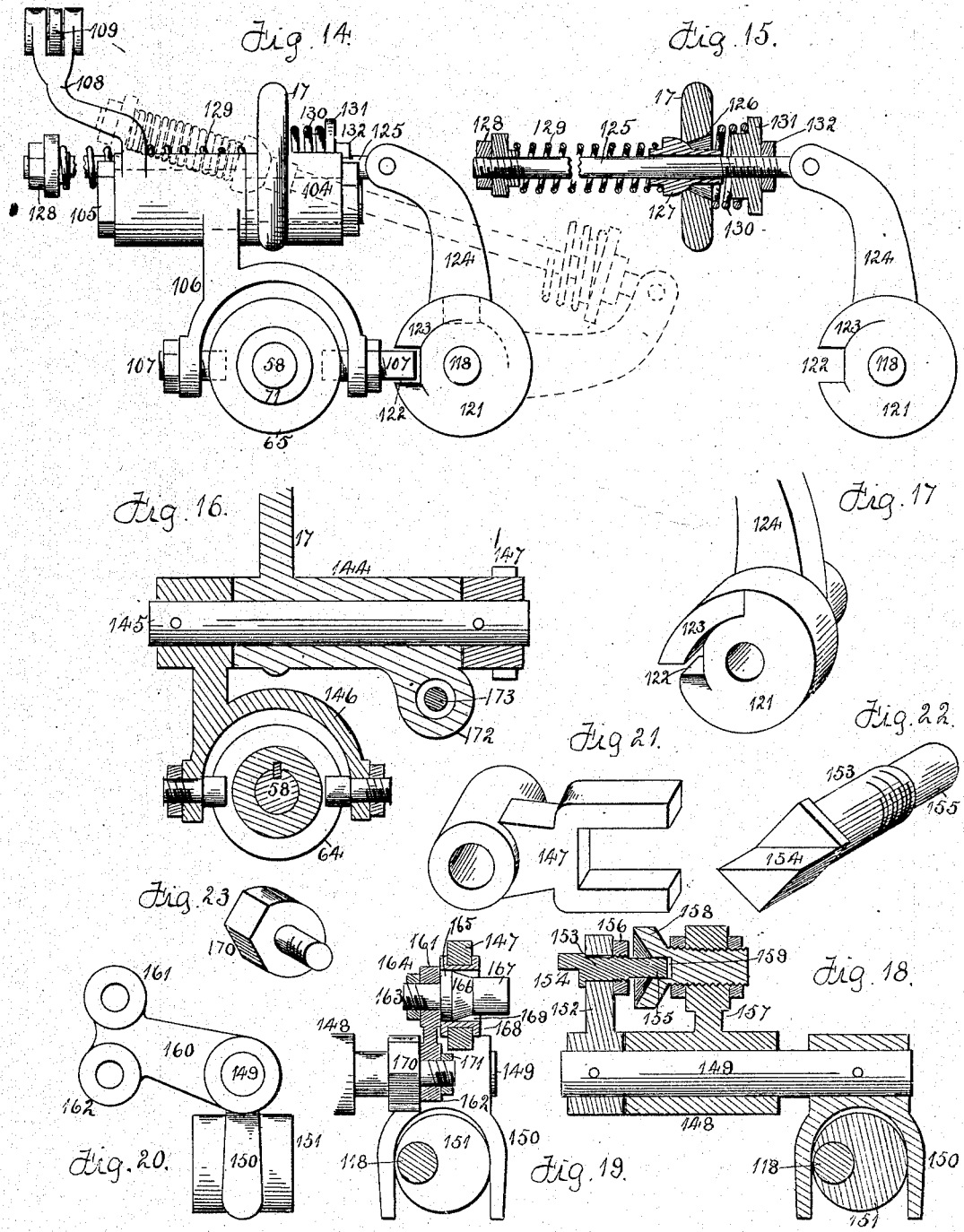

JOHN S. BARNES AND JOHN R. VINCER, OF ROCKFORD, ILLINOIS, ASSIGNORS TO W. F. & JOHN BARNES COMPANY, OF ROCKFORD, ILLINOIS, A CORPORATION OF ILLINOIS.

DRILLING-MACHINE.

948,582.	Specification of Letters Patent.	Patented Feb. 8, 1910.

Application filed October 3, 1907. Serial No. 395,796.

*To all whom it may concern:*

Be it known that we, JOHN S. BARNES and JOHN R. VINCER, citizens of the United States, residing at Rockford, in the county of Winnebago and State of Illinois, have invented certain new and useful Improvements in Drilling-Machines, of which the following is a specification.

The object of this invention is to impart to the drill spindle a quick advance movement to the work, a slow movement in the same direction while the drill is doing its work, and a quick return movement of the drill spindle to its starting position.

The further object of this invention is to employ a single means for imparting the required movements to the drill spindle but operated at different speeds during the quick advance and work feed movements, and operated in the reverse direction for the quick return movement.

The further object of this invention is to operate upon the cross-shaft of a drilling machine through one connection therewith for the quick advance, work feed and quick return.

In the accompanying drawings, Figure 1 is a side elevation of a drilling machine to which our improvements have been applied. Fig. 2 is an elevation of the reverse side to that shown at Fig. 1 in which portions of the frame have been broken away to more clearly show the operative parts. Fig. 3 is a front elevation in which the hand wheel has been removed. Fig. 4 is a vertical section showing the driving connections. Fig. 5 is a section on dotted line $a\ a$ Fig. 1. Fig. 6 is a section on dotted line $b\ b$ Fig. 1. Fig. 7 is an isometrical representation in section of the drum. Fig. 8 comprises the different parts of the pins supported by the drum. Fig. 9 is an isometrical representation of the plunger. Fig. 10 is a vertical section of the plunger showing its engagement with the projection 170. Fig. 11 is an isometrical representation of the stop 139 and its support. Fig. 12 is an isometrical representation of the arm 143 and its support. Fig. 13 is an elevation of the stop 139 and arm 143. Fig. 14 is an end elevation of the shaft 58 and rock shaft 118 and the parts connected thereto. Fig. 15 is a section on dotted line $c\ c$ Fig. 1. Fig. 16 is a section on dotted line $d\ d$ Fig. 1. Fig. 17 is an isometrical representation of the collar 121 and arm 124. Fig. 18 is a section on dotted line $e\ e$ Fig. 2. Fig. 19 is a section on dotted line $f\ f$ Fig. 2. Fig. 20 is an elevation of the eccentric 151, yoke 150, branch 160 and eyes 161 and 162. Fig. 21 is an isometrical representation of the fork 147. Fig. 22 is an isometrical representation of the pin 153. Fig. 23 is an isometrical representation of the V shaped projection 170. Fig. 24 is an isometrical representation of the collar 168. Fig. 25 is a representation of the sleeve 77 and collar 83 showing their tooth connection. Fig. 26 is a section on dotted line $g\ g$ Fig. 1.

The main frame of the drilling machine comprises the column 1 which supports the bearings 2 and 3 for the drill spindle 4, and two bearings 5 and 6 for the main driving shaft 7. The main driving shaft has a beveled pinion 8 fixedly connected to it, and which meshes with a bevel gear 9 having a splined connection with the drill spindle 4 in the usual manner. The drill spindle has a sleeve 10 connected to it in a manner to move lengthwise therewith, but held against rotation. This sleeve has a toothed rack 11 connected to it, which meshes with a spur pinion 12 forming a part of the cross shaft 13. The driving shaft 7 has a cone pulley 14 fixedly connected to it, and which is rotated by a belt connection with a cone pulley on a counter shaft. To the main frame in rear of the bearing 3 and concentric with the cross shaft 13 is secured a tubular support 15 within which the cross shaft 13 is located.

From the main frame extends a stud 16. A frame for the operative parts constitutes a center web portion 17 which supports the various bearings for the operative parts. From the web portion 17 extends an arm 18 provided with a socket portion which receives the stud 16, and connected therewith by a set-screw 19. A collar 20 extending from the web portion 17 encircles the tubular support 15. The frame for the operative parts is suspended from or mounted on the main frame of the machine by the tubular bearing 15 and the stud 16. From the upper portion of the web portion 17 project two bearings 21 which support a shaft 22. A casing 23 is supported by the shaft 22 and main driving shaft 7. This casing supports two shafts 24 and 25. A spur gear 26 has a fixed connection with the shaft 24 and meshes with a spur pinion 27 fixedly connected with the main driving shaft 7, and shown in dotted lines Fig. 3. Three spur gears 28 are loosely mounted on the shaft 24 and clutch mechanism, not shown, and movable by the handle 29 serves to connect any one of said gears with the shaft so that the gear and shaft so connected will revolve in unison. Three spur gears 30 are loosely mounted on the shaft 22 and clutch mechanism, not shown, and movable by the handle 31 serves to connect any one of said gears with the shaft so that the gear and shaft so connected will revolve in unison. Three spur gears 32 are fixedly connected to the shaft 25 to revolve therewith.

The arrangement of speed gearing forms the subject matter of another application and is not described in detail herein, as it forms no part of this application, only so far as showing a gear connection between the driving shaft 7 and the driven shaft 22. A bevel gear 33 has a fixed connection with the shaft 22.

A vertically arranged bearing 34 is formed in the web portion 17 of the frame, and a shaft 35 is supported by this bearing. To the upper end of this shaft 35 is fixedly secured a bevel gear 36 which meshes with the bevel gear 33, and to the lower end of this shaft 35 is fixedly secured a bevel gear 37. From the web portion 17 of the frame depend two arms 38 and 39, which support a tubular bearing 40 at their lower ends. To the rear portion of the main frame is secured a bracket 41 having its lower end in the form of a bearing 42. A shaft 43 is supported in the bearing 42 and in the tubular bearing 40 in a manner to revolve. To this shaft 43 is fixedly connected a driving pulley 44, and two spur gears 45 and 46. The pulley 44 is driven from any suitable source of power, as for instance by a belt from a pulley located on a power shaft. The arm 39 is provided with an opening within which is located the hub 47 of a spur gear 48, and a collar 49 is secured to the projecting end of the hub, in order that the gear may rotate within the arm, and be held against lengthwise movement. This spur gear 48 meshes with the spur gear 46.

The arm 38 is provided with an opening within which is located the hub 50 of the spur gear 51, and a collar 52 is secured to the projecting end of the hub, in order that the gear may rotate within the arm, and be held against lengthwise movement. From the arm 38 extends a projection 53 which supports a stud 54 which in turn supports a spur pinion 55. This spur pinion 55 meshes with the spur gears 45 and 51 and causes the said gears to rotate in the same direction, while the gears 46 and 48 rotate in opposite directions.

The web portion 17 of the frame is provided with two bearings 56 and 57, and a shaft 58 is located in these bearings and in openings in the spur gears 48 and 51. To this shaft 58 is fixedly connected a hand wheel 59 and a worm 60. A bevel gear 61 is loosely mounted on the shaft 58 and meshes with the bevel gear 37. This bevel gear 61 is formed with a ratchet toothed face 62, and a collar 63 fixedly connected to the shaft 58 serves to hold the bevel gear against movement in the lengthwise direction of the shaft.

On the shaft 58 are located two clutch sections 64 and 65 each having a feather connection with the shaft and capable of being moved in the lengthwise direction of the shaft and rotating with the shaft. The clutch section 64 has a ratchet toothed face 66 which is capable of engaging the ratchet teeth 62 of the bevel gear 61. The outer end of this clutch section has a stud 67 extending from it, and adapted to engage a stud 68 extending from the spur gear 51. The clutch section 65 has a projection 69 extending from one face and adapted to engage a projection 70 extending from the spur gear 48.

To the end of the shaft 58 is secured a collar 71, and a coiled spring 72 surrounds the shaft and is located between the collar and the clutch section 65, its influence being to hold the projection 69 of the clutch section in engagement with the projection 70 of the spur gear 48. A tubular bearing 73 is connected with the main frame and serves as a support for the cross shaft 13. A wheel 74 has a rotative connection with the cross shaft by the key 75, and is formed with radial openings 76 for the reception of a bar by which the wheel is turned, thereby rotating the cross shaft.

A sleeve 77 is loosely mounted on the cross shaft 13, and a worm wheel 78 has a fixed connection with the sleeve by the key 79. This worm wheel is located in engagement with the worm 60. To the sleeve 77 is connected a spur gear 80 by the key 81 so that they will rotate together. One end of this sleeve is provided with teeth 82 forming one half of a clutch. To the cross shaft 13 is connected a collar 83 by the key 84. This collar has one end provided with teeth 85 forming one half of a clutch. A groove 86 is formed in the periphery of the collar. This key connection of the collar 83 with the cross shaft is such that it will rotate with the cross shaft, but has a sliding movement in the lengthwise direction of the cross shaft. The end 87 of the cross shaft 13 is in screw form. A hand nut 88 has a screw thread connection with the screw threaded end of the cross shaft, and has a ring flange 89 supporting two screws 90 which enter the groove 86 of the collar 83, also its end 91 is in wheel form and roughened. By turning this hand nut 88 to the right, the collar 83 will be moved bodily toward the sleeve 77 which will cause the teeth 85 of the collar to engage the teeth 82 of the sleeve 77 and by turning the hand nut 88 to the left, the teeth of the collar 83 will be disengaged from the teeth 82 of the sleeve 77. When the sleeve 77 and collar 83 are in engagement, a connection is formed between the worm wheel 78, the spur gear 80 and the cross shaft 13 so that the cross shaft will be rotated by the rotations of the worm 60 engaging the worm wheel 78, and when the collars are separated this driving connection will be broken which will leave the cross shaft free to be rotated by hand through the wheel 74. As the worm wheel 78 and spur gear 80 are connected to the sleeve 77 they will always rotate together.

The bearing 92 supports a spindle 93. On this spindle is located a drum 94, provided with a toothed ring 95 adapted to mesh with the spur gear 80. The outer face of this drum 94 is formed with two concentric grooves 96 and 97, and the inner face of this drum is formed with two concentric grooves 98 and 99. Each of the grooves 96, 97, 98 and 99 is adapted to receive a pin 100, which is held in place by a nut 101 passed through an opening 102. A washer 103 is placed on the shank of the pin as shown at Fig. 7, to give a firm seating for the pin.

The bearing 104 supports a spindle 105. A yoke 106 is supported by this spindle in a manner to oscillate. This yoke has a connection with the clutch section 65 by the studs 107 entering the annular groove of the section. An arm 108 extends upward from the yoke, and to its upper end is pivotally connected a rod 109 which extends forward and has its turned down end 110 located in the path of the movement of the pin 100 located in the groove 96. From the bearing 34 extends an arm 111, the outer end of which supports a block 112 through which the rod 109 passes. Nuts 113 have a connection with the screw threaded shank 114 of the block 112, and one is located each side of the arm 111, by means of which the height of the block can be regulated to properly support the rod 109. From the inner face of the arm 39 extends a bearing 115, which in connection with the bearing 116 and 117 support a rock-shaft 118, having its forward end bent in the form of a crank 119 and terminating in a handle 120.

To the rock shaft 118 outside of the bearing 115 is secured a collar 121 which is provided with a radially extending slot 122 and adjacent to which is formed a projection 123. From this collar 121 extends an arm 124, to the upper end of which is pivoted a rod 125 which passes through an opening 126, in the web 17. The opening 126 is somewhat larger than the rod 125, and a collar 127 is placed loosely on the rod.

A nut 128 is turned on the screw threaded end of the rod 125, and a coiled spring 129 surrounds the rod 125 and is located between the nut 128 and the collar 127. A cushion spring 130 surrounds the rod 125, and is adapted to rest against the web 17. A collar 131 with a nut 132 behind it acts as an adjustable bearing for the cushion spring and is adjustably connected with the rod 125 in order that the cushion effect of the spring may be varied.

The bearing 133 supports a spindle 134, to one end of which is fixedly connected a finger 135 from which extends a handle 136. To the other end of the spindle 134 is fixedly connected a collar 137 from which extends an arm 138 having a stop 139 projecting from its face. A spring 140 (Fig. 2) has one end connected to a stationary part of the frame and its other end is connected to the eye 141 extending from the arm 138. The free end of the finger 135 is located within the path of the movement of a pin located in the concentric groove 97 of the drum, and the spring 140 serves to hold it yieldingly in such position.

To the rock shaft 118 is fixedly connected a collar 142 from which extends an arm 143. In turning the rock shaft 118 so that the handle 120 will occupy the position shown in dotted lines, Fig. 3, the arm 143 will rest on the stop 139 as shown in Fig. 13, the spring will hold the stop beneath the arm. In moving the rock shaft, the arm 124 will be moved into the position shown at Fig. 14, which will compress the spring 129 so that when the stop 139 is removed from beneath the arm 124, this spring will return the rock shaft to its normal position. In order that the rock shaft may not stop with a jar, the cushion spring 130 is provided.

The bearing 144 supports a spindle 145, to one end of which is fixedly connected a yoke 146 which has an engagement with the peripheral groove of the clutch section 64. To the other end of this spindle 145 is fixedly connected a fork 147 having its branches extending forwardly.

The bearing 148 supports a spindle 149 which is capable of a sliding movement within the support, also an oscillatory movement therein. To one end of this spindle 149 is fixedly connected a yoke 150, the branches of which embrace an eccentric 151 fixedly connected to the rock shaft 118. To the other end of the spindle 141 is fixedly connected an arm 152, the free end of which supports a pin 153 which has one end 154 triangular and its other end 155 round. The nut 156 clamps the pin in connection with the arm. From the bearing 148 extends a projection 157 which supports a cup 158 provided with a circular recess 159 of a size to receive the round end 155 of the pin 153. From the yoke 150 extends a branch 160 terminating in two eyes 161 and 162. The eye 161 supports a pin 163, which is connected therewith by the nut 164. From the larger portion 165 of the pin 163 extends a tapered portion 166 which terminates in the round reduced portion 167. The branches of the yoke 147 support a collar 168 in a manner to permit it to slide lengthwise thereof. This collar 168 has a central opening 169 within which the pin 163 is located. To the eye 162 is secured a V shaped projection 170 by the screw nut 171.

The bearing 172 receives a plunger 173, around the shank of which is located a coiled spring 174, one end of which rests against the end of the bearing and the other end rests against the head portion of the plunger. The head portion of the plunger is provided with a lengthwise extending way 175, and a pin 176 located in this way holds the plunger from turning, but permits it to move lengthwise. The projecting end 177 of this plunger is in V form, and bears against the V shaped projection 170 as shown at Figs. 2 and 10.

When the parts are in the positions shown in solid lines, the drill spindle will be at rest in its uppermost position. The clutch face 62 of the bevel gear 61 is rotated by a gear connection with the main driving shaft 7, this clutch face when connected with the shaft 58 will impart the work feed to the drill spindle through the worm 60, worm wheel 78, cross shaft 13, spur pinion 12, and rack 11. The connection between the clutch face 62 and shaft 58 is formed by moving the clutch face 66 of the slidable clutch section 64 into engagement with the clutch face 62.

The spur gears 48 and 51 are rotated through the gear connection with the shaft 43 which is rotated by a belt connection with the pulley 44. The spur gear 51 imparts the quick advancing movement to the drill spindle through the shaft 58, and this connection is formed by sliding the clutch section 64 so that the stud 67 carried thereby will contact with the stud 68 carried by the spur gear 51. The spur gear 48 imparts the quick returning movement to the drill spindle through the shaft 58, and this connection is formed by sliding the clutch section 65, so that the stud 69 carried thereby will contact with the stud 70 carried by the spur gear 48.

The action of the spring operated plunger 173 against the V-shaped projection 170 is to force the branch 160 down carrying the eye 161 with it, also move the fork 147 which would move the yoke 146 and force the clutch section 64 into engagement with the quick advancing spur gear 51. These movements are held in check by the end 155 of the pin 153 being located in the recess 159 of the cup 158, which forms a connection between a stationary part of the frame and the branch 160.

In starting the operations of the machine, the operator moves the rock shaft so that the handle 120 will stand in the position shown in dotted lines Fig. 3. This movement of the rock shaft will place the arm 143 carried thereby on the stop 139 which will prevent the return movement of the rock shaft until liberated at the proper time. This movement of the rock shaft will turn the collar 121 into the position shown in dotted lines Fig. 14 which will cause the pin 107 to ride on the face of the collar thereby holding the clutch section 65 out of engagement with the spur gear 48 against the action of the spring 72. The arm 124, when moved into the position shown in dotted lines Fig. 14, will compress the spring 129. This rocking movement of the rock shaft will turn the eccentric 151 which will force the yoke 150 inward and will carry the pin 153 with it, out of the recess 159 of the cup 158. As before stated when the pin 153 is free of the recess 159 the spring actuated plunger 173 is free to move the triangular projection 170 downward which will move the clutch section 64 into engagement with the quick advance spur gear 51 which will impart a quick downward movement to the drill spindle through the shaft 58 and cross shaft 13 as before set forth. The rotations of the cross shaft will rotate the spur gear 80 which will rotate the drum 94 in the direction indicated by the arrow thereon in Fig. 2. The movement of the pin 153 to free it of the recess 159 will also move it toward the drum 94 so that its triangular end 154 will overlap the pin 100 in the groove 98 of the drum 94. The action of the spring actuated plunger 173 in moving the clutch section 64, rocks the pin 153 so that the pin in the groove 98 may contact with one of its triangular faces 154. As the drill spindle descends, the drum will be moved in the direction indicated by the arrow on Fig. 2, until the pin 100 located in the groove 98 of the drum contacts with one of the triangular faces of the pin 153 thereby elevating the branch 160, and the eyes 161 and 162 which will withdraw the clutch section 64 from engagement with the quick spur gear 51, and will also raise the triangular projection 170 so that the spring actuated plunger 173 will contact with the under face of the V shaped projection 170, when the spring force of the plunger will further raise the section 160, and through the fork 147 will move the clutch section 64 into engagement with the work feed bevel gear 61, which will impart a slow advancing movement to the drill spindle. This slow advancing movement will continue until the pin 100 located in the groove 97 of the drum contacts with the finger 135, moving it sufficiently to move the stop 139 from beneath the arm 143 which will allow the spring 129 to act upon the arm 124 and return the rock shaft 118 to its starting position. In this return movement of the rock shaft the spring 130 will act as a cushion and prevent a sudden jar. The returning movement of the rock shaft will return the eccentric 151 into its normal position, and in so doing, it will, through the yoke 150 draw the spindle 149 with it, and the spindle will cause the pin 153 to engage the cup 158 and finally seat itself in the recess 159. This movement of the pin 153 rocks the section 160, and the eyes 161 and 162. The rocking of the eye 161 will move the fork 147 and the yoke 146 connected to it, through the spindle 145, and the yoke will withdraw the clutch section 64 from engagement with the work feed bevel gear 61 into a neutral position, when it will remain at rest. As before stated the clutch section 65 is held against the action of the spring 72 out of engagement with the quick returning spur gear 48, by the stud 107 resting on the face of the collar 121, that is, while the quick advancing and work feed movements are in operation. Upon the rock shaft being returned to its normal or starting position, the collar 121 will be returned also to its normal position, as shown at Fig. 14, so that the slot 122 of the collar will come opposite the pin 107, when the spring 72 will force the clutch section 65 into engagement with the quick returning spur gear 48, which will revolve the shaft 58 in the reverse direction consequently will raise the drill spindle, and rotate the drum in the direction indicated by the arrow on Fig. 1. The drill spindle will continue to rise and the drum to rotate until the pin 100 located in the groove 96 of the drum comes in contact with the depending end 110 of the rod 109, and moves the rod sufficiently to move the yoke 106, which will withdraw the clutch section 65 from engagement with the quick return spur gear 48 when the upward movement of the drill spindle will cease, and all the parts assume their normal or starting positions.

It will be noticed that the operator does not move the clutch section 64 into engagement with the quick advancing mechanism, but removes an obstruction which permits the spring actuated plunger to move the parts which makes the connection. It will be further noticed that as the same clutch section 64 is employed to form a connection with either the quick advancing mechanism and the work feed mechanism, that it is impossible for both of said mechanisms to be operating at the same time. It will be further noticed that the quick return mechanism is positively held out of operation until the completion of the work feed mechanism.

By adjusting the pin located in the groove 98 of the drum, different distances from the pin 153, the length of the movement of the drill spindle under the quick advancing movement can be varied. By adjusting the pin located in the groove 97 of the drum, different distances from the finger 135, the length of the movement of the drill spindle under the work feed mechanism can be varied. By adjusting the pin located in the groove 96 of the drum, the height to which the drill spindle will raise, can be varied. Should the operator wish to stop the advancing movement of the drill spindle at any time, this can be accomplished by depressing the handle 136 which moves the finger 135 the same as if moved by the pin in the groove 97 of the drum, and the quick return mechanism will be immediately set in operation as before described.

It will be noticed that the quick advancing mechanism, work feed mechanism and quick return mechanism, all operate through a single connection with the cross shaft, inasmuch as the motion from all is transmitted to said cross shaft through the same gearing. When the work feed mechanism is in connection with the drill spindle, the operator can, by turning the hand wheel 59, run the drill spindle down faster than when driven by the work feed mechanism, if for any purpose it is desirable to do so, as the connections permit the feed or cross shaft to overrun the work feed mechanism.

In certain work it is desirable to quickly advance the drill to the work, slowly advance the drill through a part of the work, again quickly advance the drill to the next section of the work and slowly advance the drill through the remainder of the work and finally quickly return the drill to its starting position, these movements we can accomplish in a very simple manner by automatically throwing the clutch section 64 from the work feed bevel gear 61 into engagement with the quick advancing spur gear 51 and again throwing the clutch section from the quick advancing spur gear 51 into the work feed bevel gear 61. As stated, the pin in the groove 98 of the drum moving in contact with the pin 153, will move the pin 153 in a direction to start the movement of the clutch section 64 into engagement with the work feed bevel gear 61, the movement being completed by the spring actuated plunger 173. This movement of the plunger will throw the pin 153 so that it will be engaged by a pin located in the groove 99 of the drum 94 which will withdraw the clutch section from the work feed bevel gear 61 and move it toward the quick advancing spur gear 51, the movement being completed by the spring actuated plunger 173. The drill spindle is again advanced under the quick feed movement, another pin located in the groove 98 of the drum contacts with the pin 153 when the work feed will again be thrown into action, and which will continue until the finger 135 is tipped.

By this construction of drilling machine, all the movements are positive, and without the employment of friction in any of its parts, so that when the operative parts are at rest only a few gears will be in motion.

We claim as our invention.

1. In a drilling machine, the combination with a rotatable and longitudinally movable drill spindle, of a feed shaft geared to the spindle for moving it longitudinally, quick advancing mechanism, a work feed mechanism, a quick return mechanism, and a single driving connection between the quick advancing, work feed and quick return mechanism and the feed shaft.

2. In a drilling machine, the combination of a rotatable and longitudinally movable drill spindle, a feed shaft geared to the spindle for effecting its longitudinal movement, quick advancing mechanism, a work feed mechanism, a quick return mechanism, a single driving connection between the quick advancing, work feed and quick return mechanisms and the feed shaft, and automatic mechanism for successively connecting the different mechanisms to the driving connection.

3. In a drilling machine, the combination of a rotatable and longitudinally movable drill spindle, a feed shaft geared to the spindle for effecting its reciprocation, quick feed mechanism, a work feed mechanism, a quick return mechanism, and a single gear driving connection between the quick advancing, work feed and quick return mechanisms and the feed shaft.

4. In a drilling machine, the combination of a rotatable and longitudinally movable drill spindle, a feed shaft for moving the spindle longitudinally, a single gear rotatably connected with the feed shaft, quick advance mechanism, a work feed mechanism, a quick return mechanism, a driving connection between the quick advancing, work feed and quick return mechanisms and said gear, and automatic mechanism for connecting and disconnecting the mechanisms to and from the driving connection.

5. In a drilling machine, the combination of a rotatable and longitudinally movable drill spindle, a feed shaft for reciprocating the spindle, an automatic work feed mechanism, a quick return mechanism, and a single driving connection between the work feed and quick return mechanisms and the feed shaft.

6. In a drilling machine, the combination with a rotatable and longitudinally movable tool spindle, of shafts geared together, one of said shafts being geared to the tool spindle for reciprocating the same, quick advance and work feed mechanisms associated with the other shaft, and automatic means for connecting the mechanisms to and disconnecting them from said other shaft.

7. In a drilling machine, the combination with a rotatable and longitudinally movable tool spindle, of angularly disposed shafts, worm gearing connecting the shafts, a gear connection between one of the shafts and the tool spindle for reciprocating the latter, quick and work feed mechanisms associated with the other shaft, and automatic means governed by the movement of the shafts for connecting and disconnecting the mechanisms to and from said other shaft.

8. In a drilling machine, the combination with a rotatable and longitudinally movable tool spindle, of shafts geared together, one of said shafts being geared to the tool spindle for reciprocating the same, work feed and quick return mechanisms associated with the other shaft, and automatic means governed by the movement of said shafts for successively connecting the mechanisms to and disconnecting them from said other shaft.

9. In a drilling machine, the combination of a rotatable and longitudinally movable drill spindle, a feed shaft for the spindle, a worm wheel revoluble with the feed shaft, a worm meshing with the worm wheel, a quick advancing mechanism for rotating the worm, and automatic means operating with the quick advancing mechanism for disconnecting the quick advancing mechanism from the worm.

10. In a drilling machine, the combination of a rotatable and longitudinally movable drill spindle, a feed shaft for reciprocating the spindle, a worm wheel revoluble with the feed shaft, a worm meshing with the worm wheel, a quick return mechanism controlled by the operation of the worm and worm wheel for rotating said worm, and automatic mechanism for connecting the quick return to and disconnecting it from the worm.

11. In a drilling machine, the combination of a rotatable and longitudinally movable drill spindle, a feed shaft for reciprocating the spindle, a worm wheel revoluble with the feed shaft, a worm meshing with the worm wheel, an advance mechanism and return mechanism for successively rotating the worm in opposite directions, and automatic means governed by the mechanisms for throwing one in and the other out of gear with the worm.

12. In a drilling machine, the combination of a rotatable and longitudinally movable drill spindle, a feed shaft for reciprocating the spindle, a worm wheel revoluble with the feed shaft, a worm meshing with the worm wheel, a work feed mechanism and a quick return mechanism for successively rotating the worm, and means controlled by said mechanisms for automatically controlling the operation of the worm by the mechanisms.

13. In a drilling machine, the combination of a rotatable and longitudinally movable drill spindle, a feed shaft for reciprocating the spindle, a second shaft, a driving connection between the shafts, a work feed mechanism and quick return mechanism for rotating the second shaft at different speeds and in opposite directions, and automatic means controlled by the operation of said mechanisms for governing the rotation of the shaft by said mechanisms.

14. In a drilling machine, the combination of a rotatable and longitudinally movable drill spindle, a feed shaft for reciprocating the spindle, a work feed mechanism and quick return mechanism having a single driving connection with the feed shaft, and automatic means controlled by and governing the mechanisms so that only one can operate at a time.

15. In a drilling machine, the combination of a rotatable and longitudinally movable drill spindle, a feed shaft for moving the spindle longitudinally, an automatic quick advancing mechanism, a work feed mechanism, a quick return mechanism, a single driving connection between said quick advancing work feed and quick return mechanisms and the feed shaft, and automatic means governed by and governing the mechanisms so that only one can operate at a time, said automatic means including devices for varying the extent of movement of the spindle.

16. In a drilling machine, the combination of a rotatable and longitudinally movable drill spindle, a feed shaft for moving the spindle longitudinally, an advancing mechanism, a return mechanism, a single driving device for connecting said advancing work feed and return mechanism with the feed shaft, means for automatically determining the extent of the longitudinal movements of the spindle, and a device carrying said means and being driven synchronously with the feed shaft.

17. In a drilling machine, the combination of a rotatable and longitudinally movable drill spindle, a feed shaft for reciprocating the spindle, a quick advancing mechanism, a work feed mechanism, a quick return mechanism, a driving device for connecting said quick advancing work feed and quick return mechanisms with said shaft, and adjustable means for automatically determining the extent of the movements of the spindle and automatically controlling the connection of the mechanisms with and their disconnection from the driving device.

18. In a drilling machine, the combination of a rotatable and longitudinally movable drill spindle, a feed shaft for longitudinally moving the spindle, a drum geared to said feed shaft, means independent of said drum for rotating said feed shaft in opposite directions, automatic means for controlling the operation of said rotating means, and means carried by said drum for automatically governing the operation of the controlling means.

19. In a drilling machine, in combination, a rotatable and longitudinally movable drill spindle, a quick advancing mechanism, a work feed mechanism, a quick return mechanism, means for automatically and successively connecting said quick-advancing work feed and quick return mechanisms with said drill spindle, and means for securing a second operation of the quick advancing mechanism and a successive automatic operation of the work feed mechanism.

20. In a drilling machine, in combination, a rotatable and longitudinally movable drill spindle, a feed shaft for reciprocating the drill spindle, a second shaft geared to said feed shaft, a quick advancing gear, a work feed gear, and a quick return gear loosely mounted on said second shaft, and adapted to operate said spindle, two clutch sections on the said second shaft, means for moving one of said clutch sections to connect said second shaft with the quick advancing and work feed gears, and means for moving the other clutch section to connect said second shaft with said quick return gear.

21. In a drilling machine, the combination with a rotatable and reciprocatory tool spindle, of means for reciprocating the same including a shaft, quick advance mechanism, work feed mechanism, and means controlled by the mechanisms for automatically and successively clutching said mechanisms to the shaft.

22. In a drilling machine, the combination with a rotatable and reciprocatory tool spindle, of means for reciprocating the same, including a shaft, quick advance mechanism, work feed mechanism, a shiftable clutch element for successively connecting said mechanisms to the shaft, and means controlled by the operation of the mechanisms for automatically shifting said clutch element from one mechanism to the other.

23. In a drilling machine, the combination with a rotatable and reciprocatory tool spindle, of means for reciprocating the same, including a shaft, quick advance mechanism, including a driving gear journaled on the shaft, work feed mechanism including a driving gear journaled on the shaft and movable in the same direction but at a different speed from the first gear, a clutch element longitudinally movable on the shaft from one gear to the other, and automatic means controlled by the operation of the shaft for shifting the clutch mechanism.

24. In a drilling machine, the combination with a rotatable and longitudinally movable tool spindle, of mechanism for longitudinally moving the same, and means for controlling the movement of the tool spindle by the mechanism, said controlling mechanism including a shifting device, a motor element for moving the shifting device, a lock for holding the shifting device against movement, and means for unlocking the shifting device to permit the motor element to operate on the shifting device.

25. In a drilling machine, the combination with a rotatable and longitudinally movable tool spindle, of mechanism for longitudinally moving the same, and means for controlling the movement of the tool spindle by the mechanism, said controlling mechanism including a shifting device, a motor element for moving the same, a lock for holding the shifting device against movement and capable of movement in two directions, and means for moving the lock in one direction to release the shifting device, said lock being moved in the other direction by the motor element.

26. In a drilling machine, the combination with a rotatable and longitudinally movable tool spindle, of mechanism for longitudinally moving the same, and means for controlling the movement of the tool spindle by the mechanism, said controlling mechanism including a shifting device, a motor element for moving the same, a lock for holding the shifting device against movement and capable of reciprocatory and swinging movement, and means for reciprocating the lock to release the shifting device, said lock being swung by the motor element when released.

27. In a drilling machine, the combination with a rotatable and longitudinally movable tool spindle, of mechanism for longitudinally moving the same, and means for controlling the operation of the tool spindle by said mechanism, including a swinging device having a movement longitudinally of its pivot axis, automatic means for swinging the device, and manual means for moving the device longitudinally of its pivot axis.

28. In a drilling machine, the combination with a rotatable and longitudinally movable tool spindle, of mechanism for longitudinally moving the same, and means for controlling the operation of the tool spindle by said mechanism, including a swinging device having a movement longitudinally of its pivot axis, a spring operated motor element for swinging the device, a lock for holding the device against swinging movement, and manual means for moving the device longitudinally of its pivot axis, and thereby disengaging it from the lock.

29. In a drilling machine, the combination with a rotatable and longitudinally movable tool spindle, of mechanism for longitudinally moving the same, and means for controlling the operation of the tool spindle by said mechanism, including a swinging device also having a movement longitudinally of its pivot axis, a spring-pressed plunger operating against the device to swing the same, a lock for holding the device against swinging movement, said device being disengaged from the lock upon its longitudinal movement, and a rock shaft having a cam engagement with the device to move it longitudinally of its pivot axis.

30. In a drilling machine, the combination with a rotatable and longitudinally movable tool spindle, of mechanism for longitudinally moving the same, a clutch for connecting the mechanism with the tool spindle, a clutch shifting device, a swinging bell crank member connected to the clutch shifting device and capable of movement longitudinally of its pivot axis, means for automatically swinging the bell crank member, a lock for holding it against swinging movement, said member being disengaged from the lock upon its movement longitudinally of the pivot axis, and means for effecting its latter movement in opposite directions.

31. In a drilling machine, the combination with a rotatable and longitudinally movable tool spindle, of a feed shaft geared thereto for effecting its reciprocation, an angularly disposed shaft geared to the feed shaft, a driving member, a clutch shiftable upon the angularly disposed shaft into and out of coaction with the driving member, a clutch shifting device having a crank arm, a swinging bell crank having one arm engaged with the crank arm and having its other arm in the form of a yoke, said bell crank being capable of movement longitudinally of its pivot axis, a spring-pressed plunger operating on the bell crank for swinging the same, a socket piece, a stud carried by the bell crank and movable into and out of the socket of said socket piece upon the movement of the bell crank longitudinally of its pivot axis, a rock shaft, and a cam carried by the rock shaft and engaging the yoke of the bell crank.

32. In a drilling machine, the combination with a rotatable and longitudinally movable tool spindle, of mechanism for moving the same, and means for controlling the movement of the tool spindle by the mechanism, including a clutch, a clutch shifting device, a member for operating the clutch shifting device, said member being capable of swinging and transverse reciprocatory movement, automatic means for swinging it in opposite directions, manual means for transversely moving it in one direction, and automatic means for transversely moving it in an opposite direction.

33. In a drilling machine, the combination with a rotatable and longitudinally movable tool spindle, of mechanism for moving the same, and means for controlling the movement of the tool spindle by the mechanism, including a clutch, a clutch shifting device, a member for operating the clutch shifting device capable of a swinging and transverse reciprocatory movement, manual means for effecting a preliminary transverse movement of the member in one direction, and automatic mechanism for swinging the member first in one direction, then in an opposite direction, and afterward moving it transversely in a direction opposite to said preliminary movement.

34. In a drilling machine, the combination with a rotatable and longitudinally movable tool spindle, of mechanism for moving the same, and means for controlling the movement of the tool spindle by the mechanism, including a clutch, a clutch shifting device, a swinging member for operating the clutch shifting device, said member being also capable of transverse reciprocation, a rock shaft having a cam connection with the member for reciprocating the same, manual means for turning the rock shaft in one direction, automatic means for turning the rock shaft in an opposite direction, automatic means for swinging the member, and a lock for the member operative to release and hold the same upon the reciprocation of said member.

35. In a drilling machine, the combination with a rotatable and longitudinally movable tool spindle, of mechanism for moving the same, and means for controlling the movement of the tool spindle by the mechanism, including a clutch, a clutch shifting device having a crank arm, a swinging bell crank member having a longitudinally movable pivot and having one arm connected to the crank arm, a socket piece, a stud carried by the bell crank member, and movable into and out of the socket of said piece upon the longitudinal movement of the pivot, a spring-pressed plunger for swinging the bell crank member in opposite directions, a rock shaft having a cam connection with the bell crank member, a handle carried by the rock shaft for moving the same in one direction, a spring connected to the rock shaft for moving it in an opposite direction, a lock for holding the rock shaft against movement after its manual operation, and automatic means for operating the lock to release the rock shaft.

36. In a drilling machine, the combination with a rotatable and longitudinally movable tool spindle, of mechanism for moving the same, and means for controlling the movement of the tool spindle by the mechanism, including a clutch, a spring for moving the clutch in one direction, automatic means operated by said mechanism for moving the clutch against action by the spring, a rock shaft having means for locking the clutch against movement by the spring, means for moving the rock shaft in one direction, and automatic means for rotating the rock shaft in an opposite direction and thereby releasing the clutch.

37. In a drilling machine, the combination with a rotatable and longitudinally movable tool spindle, of mechanism for moving the same, and means for controlling the movement of the tool spindle by the mechanism, including a clutch, automatic means for shifting the clutch to connect the mechanism with the tool spindle, a rock shaft having means for locking the clutch against movement by the spring and holding it out of action, manual means for moving the rock shaft in one direction, and automatic means for rotating the rock shaft in an opposite direction and thereby releasing the clutch.

38. In a drilling machine, the combination with a rotatable and longitudinally movable tool spindle, of mechanism for moving the same, and means for controlling the movement of the tool spindle by the mechanism, including a clutch, automatic means for shifting the clutch to connect the mechanism with the tool spindle, a rock shaft having means for locking the clutch against movement by the spring and holding it out of operation, manual means for moving the rock shaft in one direction, automatic means for rotating the rock shaft in an opposite direction and thereby releasing the clutch, and a lock automatically actuated by the tool spindle moving means for locking the rock shaft against movement.

39. In a drilling machine, the combination with a rotatable and longitudinally movable tool spindle, of means for effecting its longitudinal movement, including a shaft geared thereto, a work and a quick advance feed mechanism, including separate driving devices, a shiftable clutch for connecting either device to the shaft, manual means for effecting the movement of the clutch into engagement with the quick advancing driving device, automatic means for moving the clutch out of such engagement and into engagement with the work feed driving device, and automatic mechanism for thereafter shifting the clutch out of engagement with both driving devices, quick return mechanism including a driving device, a clutch for connecting the same to the shaft, and mechanism for automatically throwing the clutch to a position to connect the latter driving device to the shaft when the first mentioned clutch is out of engagement with both of its driving devices.

40. In a drilling machine, the combination with a rotatable and longitudinally movable drill spindle, of a feed shaft for moving the spindle longitudinally, a single gear rotatably connected with the feed shaft, alvance and return mechanisms for rotating the gear in opposite directions, a driving connection between said mechanisms and the gear, and automatic mechanism governed by said mechanisms for connecting and disconnecting the mechanisms to and from the driving connection.

41. In a drilling machine, the combination with a rotatable and longitudinally movable drill spindle, of a feed shaft for reciprocating the spindle, automatic work feed mechanism, a quick return mechanism, a single driving connection between the work feed and quick return mechanisms, and the feed shaft, and automatic means controlled by said mechanisms for governing the operation of the single driving connection by said mechanisms.

In testimony whereof we have hereunto set our hands in presence of two subscribing witnesses.

JOHN S. BARNES.
JOHN R. VINCER.

Witnesses:
E. J. BRYDEN,
A. O. BEHEL.